US012583485B2

(12) United States Patent
Hayashi et al.

(10) Patent No.: US 12,583,485 B2
(45) Date of Patent: Mar. 24, 2026

(54) DRIVING ASSISTANCE DEVICE, DRIVING ASSISTANCE METHOD, AND NON-TRANSITORY COMPUTER READABLE MEDIUM STORING DRIVING ASSISTANCE PROGRAM

(71) Applicant: DENSO CORPORATION, Kariya-city (JP)

(72) Inventors: Akihiro Hayashi, Kariya-city (JP); Kahori Okada, Kariya-city (JP); Kazuki Kojima, Kariya-city (JP); Shiori Maneyama, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 620 days.

(21) Appl. No.: 17/987,907

(22) Filed: Nov. 16, 2022

(65) Prior Publication Data

US 2023/0074566 A1    Mar. 9, 2023

Related U.S. Application Data

(63) Continuation of application No. PCT/JP2021/018810, filed on May 18, 2021.

(30) Foreign Application Priority Data

May 22, 2020    (JP) ................................. 2020-089802

(51) Int. Cl.
*B60W 60/00*        (2020.01)
*B60W 40/04*        (2006.01)
*B60W 40/105*       (2012.01)

(52) U.S. Cl.
CPC ........ *B60W 60/0057* (2020.02); *B60W 40/04* (2013.01); *B60W 40/105* (2013.01);
(Continued)

(58) Field of Classification Search
CPC ............. B60W 60/0057; B60W 40/04; B60W 40/105; B60W 60/0053; B60W 60/0059;
(Continued)

(56) References Cited

U.S. PATENT DOCUMENTS

2016/0121907 A1    5/2016  Otake
2017/0315556 A1    11/2017  Mimura et al.
(Continued)

FOREIGN PATENT DOCUMENTS

JP        2005324661 A    11/2005
JP        2011237175 A    11/2011
(Continued)

*Primary Examiner* — Frederick M Brushaber
(74) *Attorney, Agent, or Firm* — Harness, Dickey & Pierce, P.L.C.

(57)                ABSTRACT

A driving assistance device is configured to assist driving of a vehicle having an autonomous driving function. A traffic status acquisition unit is configured to acquire a traffic status in a section between a present location of the vehicle, which drives in automatic operation in an automatic operation feasible section, and an end point of the automatic operation feasible section. The automatic operation feasible section is set as a limited domain in advance on map information. A timing determination unit is configured to alter change request timing, at which a change request is made to request a driver to make a driving change from the autonomous driving function to the driver, according to the traffic status acquired by the traffic status acquisition unit.

20 Claims, 5 Drawing Sheets

(52) U.S. Cl.
CPC .... *B60W 60/0053* (2020.02); *B60W 60/0059*
(2020.02); *B60W 2554/406* (2020.02); *B60W*
*2556/40* (2020.02)

(58) Field of Classification Search
CPC ....... B60W 2554/406; B60W 2556/40; B60W
2520/10; G08G 1/16
See application file for complete search history.

(56) References Cited

U.S. PATENT DOCUMENTS

| | | | |
|---|---|---|---|
| 2019/0004513 A1 | 1/2019 | Chiba et al. | |
| 2019/0039618 A1 | 2/2019 | Mori | |
| 2020/0283028 A1* | 9/2020 | Oba | B60W 60/0057 |
| 2020/0377126 A1* | 12/2020 | Obata | B60K 35/80 |
| 2022/0009524 A1* | 1/2022 | Oba | B60W 50/14 |

FOREIGN PATENT DOCUMENTS

| | | | |
|---|---|---|---|
| JP | 2015182525 A | 10/2015 | |
| JP | 2016090274 A | 5/2016 | |
| JP | 2017030518 A | 2/2017 | |
| JP | 2017159885 A | 9/2017 | |
| JP | 2017200786 A | 11/2017 | |
| WO | WO-2019097944 A1 | 5/2019 | |

\* cited by examiner

DRIVING ASSISTANCE DEVICE, DRIVING ASSISTANCE METHOD, AND NON-TRANSITORY COMPUTER READABLE MEDIUM STORING DRIVING ASSISTANCE PROGRAM

CROSS REFERENCE TO RELATED APPLICATION

The present application is a continuation application of International Patent Application No. PCT/JP2021/018810 filed on May 18, 2021, which designated the U.S. and claims the benefit of priority from Japanese Patent Application No. 2020-089802 filed on May 22, 2020. The entire disclosures of all of the above applications are incorporated herein by reference.

TECHNICAL FIELD

The present disclosure relates to a driving assistance device, a driving assistance method, and a non-transitory computer readable medium storing a driving assistance program that assist driving of a vehicle having an autonomous driving function.

BACKGROUND

Hereinafter, examples of the present disclosure will be described. Conventionally, a vehicle, such as an automobile, having an autonomous driving function is configured to switch from automatic operation to manual operation.

SUMMARY

According to an aspect of the present disclosure, a driving assistance device is configured to assist driving of a vehicle having an autonomous driving function.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
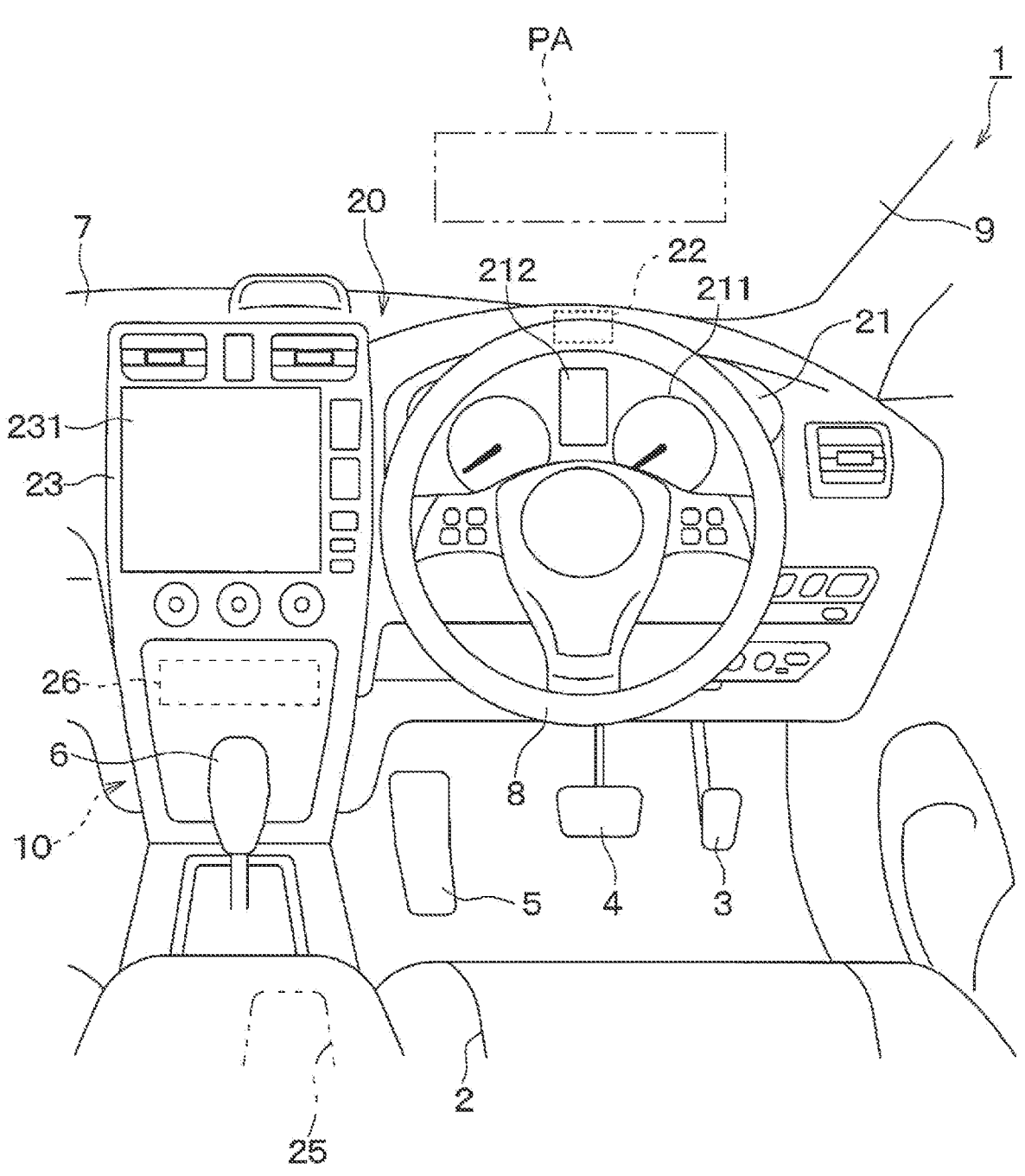
FIG. 1 is a schematic diagram illustrating the appearance of the interior of the vehicle compartment in a vehicle equipped with an onboard system according to an embodiment.

Hereinafter, examples of the present disclosure will be described. In a vehicle, such as an automobile, having an autonomous driving function, switching can be made from automatic operation to manual operation. An autonomous driving assistance device according to an example of the present application sets, as an adjustment section, a section from a starting point for switching from automatic operation to manual operation to a predetermined distance before the starting point based on navigation map information. This autonomous driving assistance device acquires the coordinate position of a starting point of an adjustment section based on navigation map information and stores this coordinate position as a switching notification point at which switching from automatic operation to manual operation is notified of. When a subject vehicle position arrives at a switching notification point, the autonomous driving assistance device gives voice guidance via a speaker.

When an automatic operation feasible section set on map information as a limited domain in advance ends and transition is made from automatic operation to manual operation or the like, a driving change is required from the autonomous driving function to a driver. According to the above-mentioned configuration, at this time, a driving change is notified of at a predetermined point determined according to map information. However, for example, in case of a traffic jam, a considerable amount of time can lapse after a driving change is notified of and a driving change is started at such a predetermined point and before an automatic operation section actually ends.

According to an example of the disclosure, a driving assistance device is configured to assist driving of a vehicle having an autonomous driving function. The driving assistance device comprises a traffic status acquisition unit configured to acquire a traffic status in a section between a present location of the vehicle, which drives in automatic operation in an automatic operation feasible section, and an end point of the automatic operation feasible section, the automatic operation feasible section being set as a limited domain in advance on map information. The driving assistance device further comprises a timing determination unit configured to alter change request timing, at which a change request is made to request a driver to make a driving change from the autonomous driving function to the driver, according to the traffic status acquired by the traffic status acquisition unit.

Embodiment

Hereafter, a description will be given to an embodiment of the present disclosure with reference to the drawings. If a description of various modifications applicable to one embodiment is inserted into a series of descriptions of that embodiment, understanding of that embodiment can be impeded. For this reason, a modification will not be described in the middle of a series of descriptions of that embodiment but will be thereafter described in the mass.

(Configuration)

Referring to FIG. 1, a vehicle 1 is a so-called ordinary-sized motor vehicle and includes a plurality of occupant seats including a driver's seat 2 in a vehicle compartment that is the internal space of a box-shaped vehicle body. An occupant occupying the driver's seat 2 will be hereafter referred to as "driver."

An accelerator pedal 3, a brake pedal 4, and a footrest 5 are provided in front of the driver's seat 2. A gear shift lever 6 is provided diagonally in front of the driver's seat 2. The accelerator pedal 3, the brake pedal 4, and the footrest 5 are disposed below a dashboard 7 provided in front of the driver's seat 2. A steering wheel 8 is attached to a steering column, not shown, extended rearward from the dashboard 7 toward the driver's seat 2. A front wind shield 9 is provided above the dashboard 7.

Figure 2:
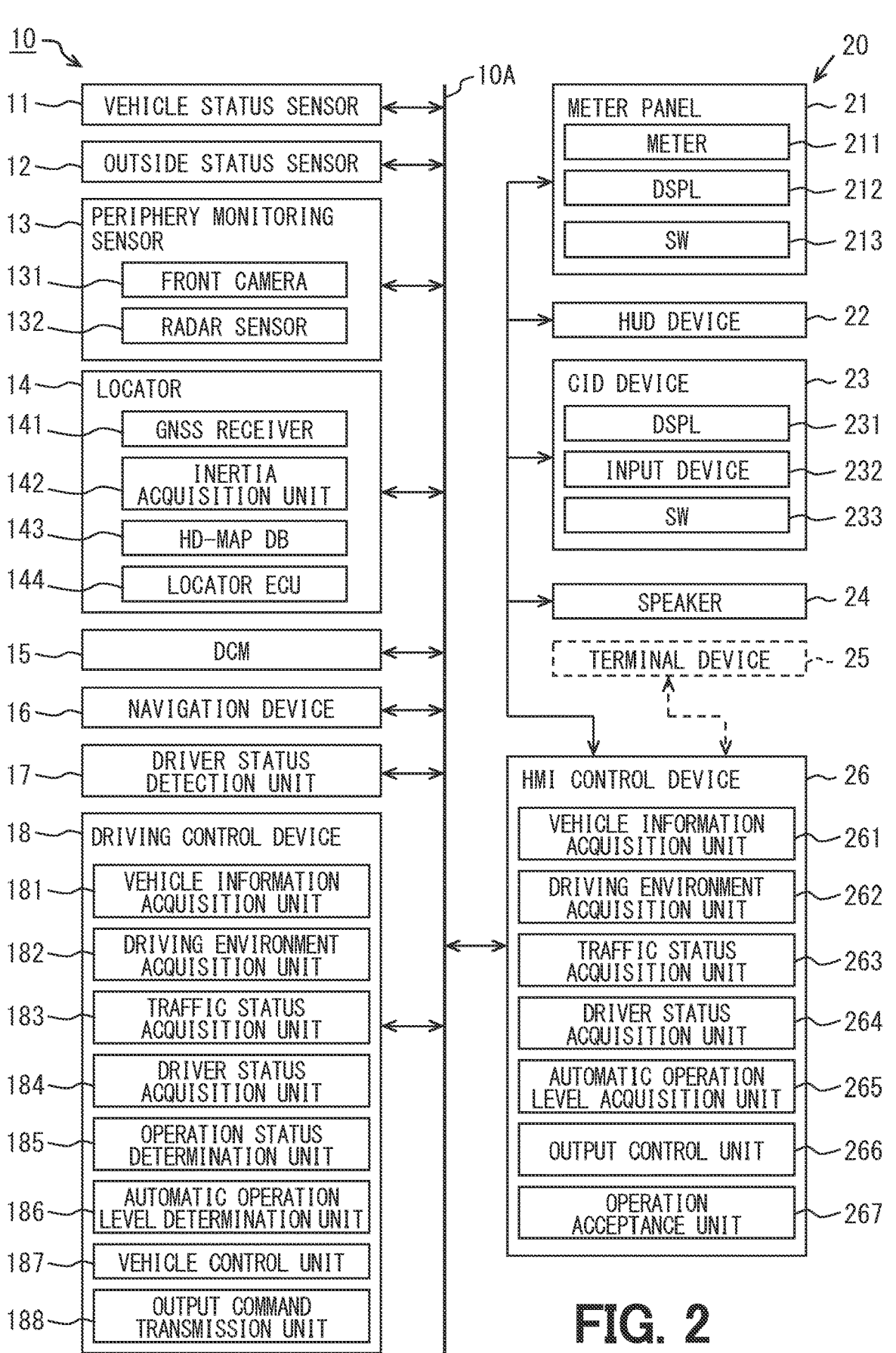
FIG. 2 is a block diagram schematically illustrating a configuration of the onboard system shown in FIG. 1.

The vehicle 1 is equipped with an onboard system 10. The relevant vehicle 1 equipped with the onboard system 10 may be hereafter referred to as "subject vehicle" sometimes. FIG. 2 schematically illustrates a block configuration of the onboard system 10. Hereafter, a description will be given to a general configuration of the onboard system 10 with reference to FIG. 1 and FIG. 2.

The subject vehicle has an autonomous driving function. That is, the onboard system 10 is configured so as to implement a function of an automatic operating system of the subject vehicle by being equipped in the subject vehicle.

The "automatic operation" is equivalent to Levels 3 to 5 according to the "SAE J3016" standard published by the SAE International and refers to an automatic operation level at which an automatic operating system takes charge of, that is, performs all the dynamic operation tasks. SAE is an abbreviation for Society of Automotive Engineers. The "dynamic operation task" refers to all the operational and tactical functions that must be performed in real time when operating the subject vehicle in road traffic except strategical functions. The "strategical functions" include travel planning, route selection, and the like and specifically include determining or selecting "whether to go, when, where, and how to go."

Level X according to "SAE J3016" will be hereafter simply referred to "Level X." X is any of 0 to 5. Hereafter, as a numeric value of X is increased or as a number of dynamic operation tasks an automatic operating system takes charge of, that is, performs is increased, the automatic operation level will be expressed as "higher." Increase in the numeric value of X will be referred to as "increase" in automatic operation level. Meanwhile, as a numeric value of X is reduced or a number of dynamic operation tasks an automatic operating system takes charge of, that is, performs is reduced, the automatic operation level will be expressed as "lower." Decrease in the numeric value of X will be referred to as "decrease" in automatic operation level.

According to "SAE J3016," the contents of levels 0 to 5 are specifically as described below. However, the name of an automatic operation level written together with each level is not described in "SAE J3016" but is for use in the present specification for convenience's sake. In the following description of the contents of Levels, "OEDR" is an abbreviation for Object and Event Detection and Response and is also referred to as "detection and response of object and event". OEDR includes the monitoring of a driving environment. The monitoring of a driving environment includes detection, recognition, and classification of an object and an event. Further, the monitoring of a driving environment includes preparation for a response to an object and an event according to necessity. "Limited domain" is a specific condition so designed that some automatic operating system or a function thereof is actuated and is also referred to as operational design domain or ODD. ODD is an abbreviation for Operational Design Domain. A limited domain includes at least one of a plurality of constraint conditions including, for example, geographical, environmental, speed, temporal, and other like conditions.

Level 0: Manual operation—A driver performs all the dynamic operation tasks.

Level 1: Driving assistance—An automatic operating system continuously performs either a longitudinal vehicle motion control subtask (that is, taking-off, acceleration/deceleration, and stopping) or a lateral vehicle motion control subtask (that is, steering) among the dynamic operation tasks in a specific limited domain. However, the automatic operating system does not simultaneously perform both a longitudinal vehicle motion control subtask and a lateral vehicle motion control subtask.

Level 2: Advanced driving assistance—An automatic operating system continuously performs a longitudinal vehicle motion control subtask and a lateral vehicle motion control subtask among the dynamic operation tasks in a specific limited domain. A driver is expected to perform OEDR which is a subtask of the dynamic operation tasks to monitor the automatic operating system.

Level 3: Conditional automatic operation—An automatic operating system continuously performs all the dynamic operation tasks in a specific limited domain. As a rule, a driver is not obligated to perform such OEDR as the monitoring of the periphery of the subject vehicle. However, when this automatic operation level becomes difficult to continue, the automatic operating system requests a driving change of a driver with a sufficient time allowance. The driver is required to appropriately cope with the request.

Level 4: Advanced automatic operation—An automatic operating system continuously performs all the dynamic operation tasks in a specific limited domain. When the automatic operation level becomes difficult to continue in a specific limited domain, the automatic operating system copes with that.

Level 5: Fully automatic operation—An automatic operating system unlimitedly and continuously performs all the dynamic operation tasks without limitation to a specific limited domain. Also, when the automatic operation level becomes difficult to continue, the automatic operating system unlimitedly copes with that without limitation to a specific limited domain.

In the present embodiment, the onboard system 10 is configured so as to be capable of implementing the automatic operation levels of levels 0 to 3 at the subject vehicle. Specifically, the onboard system 10 is configured so as to be capable of performing ACC and LKA equivalent to Level 1. ACC is adaptive cruise control, that is, following distance control. LKA is an abbreviation for Lane Keeping Assistance and is lane keeping assistance control. The onboard system 10 is configured so as to be capable of performing "hands-off driving" and "advanced safe driving assistance" equivalent to Level 2. "Hands-off driving" refers to that an automatic operating system automatically executes taking-off, steering, acceleration/deceleration, and stop controls on condition that a driver should appropriately cope with an intervention request or the like from an automatic operating system. "Advanced safe driving assistance" refers to, on condition that a driver should drive the subject vehicle, that an automatic operating system operating in parallel performs a driving assistance operation in a timely manner at a scene at which a collision can occur or on other like occasions. In the present specification, hereafter, automatic operation at Level 3 will be simply referred to as "automatic operation" unless any special supplementary explanation is given.

(System Configuration)

The onboard system 10 is configured so as to be capable of performing various vehicle controls during running of the subject vehicle and various operations associated therewith, for example, image display and/or voice output operation and the like. As shown in FIG. 2, the onboard system 10 is configured as an in-vehicle network including an in-vehicle communication line 10A and a plurality of nodes and the like connected with one another via the in-vehicle communication line 10A. The onboard system 10 is configured to conform to such a predetermined telecommunications standard as CAN (international trademark registration: International Trademark Registration No. 1048262A). CAN (international trademark registration) is an abbreviation for Controller Area Network.

The onboard system 10 includes a vehicle status sensor 11, an outside status sensor 12, a periphery monitoring sensor 13, a locator 14, DCM 15, a navigation device 16, a driver status detection unit 17, a driving control device 18, and an HMI device 20. DCM is an abbreviation for Data Communication Module. The vehicle status sensor 11 to the HMI device 20 are connected to the in-vehicle communication line 10A.

The HMI device 20 is configured so as to display an image viewably by at least occupants of the subject vehicle including a driver and output voice audibly by occupants of the subject vehicle. Specifically, the HMI device 20 is configured so as to provide varied information and/or entertainment to occupants of the subject vehicle via image and/or voice input/output equipment including a meter panel 21, an HUD device 22, a CID device 23, a speaker 24, and a terminal device 25. CID is an abbreviation for Center Information Display. HUD is an abbreviation for head up display. The details of the configurations of the meter panel 21 and the like will be described later. The terminal device 25 is portable or wearable electronic equipment carried into the subject vehicle by an occupant of the subject vehicle including a driver and is, for example, a cellular phone, a tablet terminal, a notebook computer, a portable game machine, a smartwatch, or the like.

The HMI device 20 includes an HMI control device 26 configured so as to control output of an image and/or voice at the meter panel 21 or the like. That is, the HMI control device 26 is configured so as to control operation of the HMI device 20 constituting an in-vehicle infotainment system. The meter panel 21 to the speaker 24 are communicably connected with the HMI control device 26 via a sub-communication line different from the in-vehicle communication line 10A. When carried into the subject vehicle, the terminal device 25 is information-communicably connected with the HMI control device 26 via such short-range radio communication as Bluetooth (registered trademark) or TransferJet (registered trademark). The HMI control device 26 is provided as a node connected to the in-vehicle communication line 10A. The details of the configuration of the HMI control device 26 will be described later.

(Various Sensors)

The vehicle status sensor 11 is provided so as to generate outputs corresponding to various quantities related to a driving status of the subject vehicle. The "various quantities related to a driving status" include various quantities related to a status of driving operation by a driver or an automatic operating system and include, for example, an accelerator opening, a braking amount, a shift position, a steering angle, and the like. Further, the "various quantities related to a driving status" include physical quantities related to a behavior of the subject vehicle and include, for example, vehicle speed, angular velocity, longitudinal acceleration, side acceleration, and the like. That is, the vehicle status sensor 11 is a generic name for publicly known sensors required for vehicle driving control, including an accelerator opening sensor, a steering angle sensor, a wheel speed sensor, an angular velocity sensor, an acceleration sensor, and the like, for the sake of simplification of illustration and description. The vehicle status sensor 11 is provided so as to be capable of providing detection output to each unit, such as the driving control device 18, via the in-vehicle communication line 10A.

The outside status sensor 12 is provided so as to generate output corresponding to various quantities related mainly to a natural environment among the driving environments of the subject vehicle. The "various quantities related to a natural environment" include, for example, such physical quantities as ambient temperature, a rainfall, and illuminance. That is, the outside status sensor 12 is a generic name for publicly known sensors, including an ambient temperature sensor, a raindrop sensor, an illuminance sensor, and the like, for the sake of simplification of illustration and description. The outside status sensor 12 is provided so as to be capable of providing detection output to each unit, such as the driving control device 18, via the in-vehicle communication line 10A.

The periphery monitoring sensor 13 is provided so as to mainly detect those other than detectable by the outside status sensor 12 among the driving environments of the subject vehicle. Specifically, the periphery monitoring sensor 13 is configured so as to be capable of detecting moving objects and stationary objects within a predetermined detection range around the subject vehicle. The "moving objects" include a pedestrian, a cyclist, an animal, and other running vehicles. The "stationary objects" include a roadside structure (for example, a wall, a building, and the like) as well as dropping on the road, a guardrail, a curb, a parked/stopping vehicle, a road sign, and a painted traffic sign. The periphery monitoring sensor 13 may also be referred to as "ADAS sensor." ADAS is an abbreviation for Advanced Driver-Assistance Systems.

In the present embodiment, the periphery monitoring sensor 13 includes a front camera 131 and a radar sensor 132 as configuration elements for detecting moving objects and stationary objects. The front camera 131 is provided so as to pick up images of areas ahead of and laterally ahead of the subject vehicle. In the present embodiment, the front camera 131 is a digital camera device and includes such an image sensor as CCD or CMOS. CCD is an abbreviation for Charge Coupled Device. CMOS is an abbreviation for Complementary MOS.

The radar sensor 132 is a millimeter wave radar sensor, a submillimeter wave radar sensor, or a laser radar sensor that transmits or receives radar waves and is mounted at the front face portion of the vehicle body of the subject vehicle. The radar sensor 132 is configured so as to output signals corresponding to the position and relative velocity of a reflecting point. The "reflecting point" is a point on the surface of an object present in the vicinity of the subject vehicle at which point a radar wave is estimated to have been reflected. The "relative velocity" is a relative velocity of a reflecting point, or an object that has reflected a radar wave, to the subject vehicle.

(Locator)

The locator 14 is configured so as to acquire high-precision positional information and the like of the subject vehicle via so-called complex positioning. Specifically, the locator 14 includes a GNSS receiver 141, an inertia acquisition unit 142, a high-density map DB 143, and a locator ECU 144. GNSS is an abbreviation for Global Navigation Satellite System. DB is an abbreviation for database. ECU is an abbreviation for Electronic Control Unit. The "high-precision positional information" is positional information having positional accuracy, for example, of such an extent that the information can be utilized for Level 2 or higher automatic operation levels, specifically, of such an extent that an error is less than 10 cm.

The GNSS receiver 141 is provided so as to receive positioning signals transmitted from a plurality of positioning satellites, that is, artificial satellites. In the present embodiment, the GNSS receiver 141 is configured so as to be capable of receiving positioning signals from positioning satellites of at least one satellite positioning system from among GPS, QZSS, GLONASS, Galileo, IRNSS, BeiDou Navigation Satellite System, and the like. GPS is an abbreviation for Global Positioning System. QZSS is an abbreviation for Quasi-Zenith Satellite System. GLONASS is an abbreviation for Global Navigation Satellite System. IRNSS is an abbreviation for Indian Regional Navigation Satellite System.

The inertia acquisition unit 142 is configured so as to acquire acceleration and angular velocity exerted on the subject vehicle. In the present embodiment, the inertia acquisition unit 142 is provided as a three-axis gyro sensor and a three-axis acceleration sensor built in a box-shaped enclosure of the locator 14.

The high-density map DB 143 is configured based on a nonvolatile rewritable memory so as to rewritably store high-precision map information and hold stored contents even when power supply is interrupted. The nonvolatile rewritable memory is, for example, a hard disk, EEPROM, a flash ROM, or the like. EEPROM is an abbreviation for Electronically Erasable and Programmable ROM. ROM is an abbreviation for Read Only Memory. The high-precision map information is also referred to as high-precision map data. The high-precision map information includes map information higher in precision than map information used in conventional car navigation systems providing for a positional error of several meters or so. Specifically, the high-density map DB 143 holds information that can be utilized for Level 2 or higher automatic operation levels, including three-dimensional road shape information, number-of-lanes information, regulation information, and the like in accordance with such a predetermined standard as the ADASIS standard. ADASIS is an abbreviation for Advanced Driver Assistance Systems Interface Specification.

The locator ECU 144 is configured as a so-called onboard microcomputer including CPU, ROM, RAM, an input/ output interface, and the like, none of which is shown. CPU is an abbreviation for Central Processing Unit. RAM is an abbreviation for Random Access Memory. The locator ECU 144 is configured so as to successively compute the position, bearing and the like of the subject vehicle based on a positioning signal received at the GNSS receiver 141, acceleration and angular velocity acquired at the inertia acquisition unit 142, vehicle speed acquired from the vehicle status sensor 11, and the like. The locator 14 is provided so as to be capable of providing results of computation of position, bearing, and the like by the locator ECU 144 to each part, such as the navigation device 16, the driving control device 18, the HMI control device 26, and the like, via the in-vehicle communication line 10A.

(DCM)

The DCM 15 is an onboard communication module and is provided so as to be capable of communicating information between the DCM and a base station in the vicinity of the subject vehicle through radio communication conforming to such a telecommunications standard as LTE, 5G, or the like. LTE is an abbreviation for Long Term Evolution. 5G is an abbreviation for 5th Generation.

Specifically, for example, the DCM 15 is configured so as to acquire latest high-precision map information from a probe server in a cloud. The DCM 15 stores acquired latest high-precision map information in the high-density map DB 143 in cooperation with the locator ECU 144. Further, the DCM 15 is configured so as to acquire traffic information including information about a traffic status (for example, traffic jam information and the like) from the above-mentioned probe server and/or a predetermined database. The "traffic jam information" includes the location and length of a congested section. Specifically, the traffic jam information includes the forefront position of a congestion, the rearmost position of a congestion, an estimated congestion length, an estimated congestion duration, and the like. The traffic information is also referred to as "road traffic information." According to definitions by East Nippon Expressway Company Limited and Metropolitan Police Department, "congestion" refers to a state in which a motorcade repeatedly running at low speed not more than a threshold speed or stopping and taking off continues to a "predetermined extent." The threshold speed is, for example, 20 km/h on an ordinary road and an arterial road and 40 km/h on a highway. The "predetermined extent" is, for example, 1 km or longer and 15 minutes or longer.

(Navigation Device)

The navigation device 16 is provided so as to acquire a planned traveling route from the present location of the subject vehicle to a destination. Specifically, the navigation device 16 is configured so as to compute a planned traveling route based on: a destination set by a driver or the like of the subject vehicle; high-precision map information acquired from the locator 14; and the positional information and bearing information of the subject vehicle acquired from the locator 14. The navigation device 16 is configured so as to be capable of providing varied information, including route information, as a result of computation to each part, such as the driving control device 18, the HMI control device 26, and the like, via the in-vehicle communication line 10A. That is, in the present embodiment, the navigation device 16 is designed to cause the HMI device 20 to make navigation screen display and voice output for map display, route display, and the like.

(Driver Status Detection Unit)

The driver status detection unit 17 is provided so as to detect a driver status. The "driver status" is a status of a driver occupying the driver's seat 2 in the subject vehicle and includes at least any one of a sight direction, a posture, a behavior, a mental state, and the like. In the present embodiment, specifically, the driver status detection unit 17 is designed so as to detect a face orientation, a sight direction, and a seating posture of a driver. Further, the driver status detection unit 17 is designed so as to detect a state of placement of a driver's foot on the accelerator pedal 3 or the like, a state of operation of the accelerator pedal 3 and the brake pedal 4, a state of the grasping on and a state of operation with the steering wheel 8, and the like. The driver status detection unit 17 is provided so as to be capable of providing a result of detection of a driver status to each part, such as the driving control device 18 and the HMI control device 26, via the in-vehicle communication line 10A.

(Driving Control Device)

The driving control device 18 is configured as an "automatic operation ECU" or a "driving assistance ECU." That is, the driving control device 18 is provided so as to perform a predetermined driving control operation and thereby assist the driving of the subject vehicle having an autonomous driving function and a driving assistance function. In the present embodiment, the "predetermined driving control operation" includes a vehicle control operation, that is, a dynamic operation task execution operation corresponding to Levels 1 to 3.

In the present embodiment, specifically, the driving control device 18 is provided so as to set the automatic operation level of the subject vehicle to any of Levels 0 to 3. The driving control device 18 is configured so as to control the driving of the subject vehicle based on signals and information acquired from the vehicle status sensor 11, the outside status sensor 12, the periphery monitoring sensor 13, the locator 14, and the like.

The driving control device 18 is configured as a so-called onboard microcomputer including CPU, ROM, a nonvolatile rewritable memory, RAM, and input/output interface, and the like, none of which is shown. Specifically, the driving control device 18 includes the following functional configurations or functional units implemented on the onboard microcomputer. That is, the driving control device 18 includes a first vehicle information acquisition unit 181, a first driving environment acquisition unit 182, a first traffic status acquisition unit 183, a first driver status acquisition unit 184, an operation status determination unit 185, an automatic operation level determination unit 186, a vehicle control unit 187, and an output command transmission unit 188.

The first vehicle information acquisition unit 181 is provided so as to acquire information related to a driving status of the subject vehicle. Specifically, the first vehicle information acquisition unit 181 is designed so as to acquire various quantities related to a driving status of the subject vehicle detected or acquired by the vehicle status sensor 11 from the vehicle status sensor 11.

The first driving environment acquisition unit 182 is provided so as to acquire information related to a driving environment of the subject vehicle. Specifically, the first driving environment acquisition unit 182 is designed so as to acquire various quantities related to a natural environment around the subject vehicle detected or acquired by the outside status sensor 12 from the outside status sensor 12. The first driving environment acquisition unit 182 is designed so as to acquire a result of object detection by the periphery monitoring sensor 13 from the periphery monitoring sensor 13. The first driving environment acquisition unit 182 is designed so as to acquire the present location and a planned traveling route of the subject vehicle and high-precision map information related to these items from the locator 14 and the navigation device 16.

The first traffic status acquisition unit 183 is provided so as to acquire information related to a traffic status on a planned traveling route of the subject vehicle and in the vicinity thereof. The "traffic status" is a dynamic status of vehicle traffic on a road, that is, a status related to the presence/absence of an occurrence of a traffic disturbance and includes a degree of congestion, a status of traffic regulation, and the like. The "traffic status" is typically a status of an occurrence of congestion. A traveling speed of the subject vehicle can also be included in the "traffic status" in a broad sense. A "road condition" which is a statistic status related to the shape or structure of a road, for example, the width, up-slope angle, or the like of a road is not included in the "traffic status." Meanwhile, the "running statuses" include a driving status, a driving environment, a traffic status, and road conditions.

Specifically, the first traffic status acquisition unit 183 is provided so as to acquire, from the DCM 15, information related to a traffic status at the present location of the subject vehicle and in the vicinity thereof and in a section from the present location to a destination. When the subject vehicle is running in automatic operation, the first traffic status acquisition unit 183 is designed so as to acquire a traffic status of a section from the present location of the subject vehicle to the end point of an automatic operation feasible section in which the subject vehicle is running. The "automatic operation feasible section" is a road section set on map information as a limited domain in advance.

The first driver status acquisition unit 184 is provided so as to acquire a driver status. Specifically, the first driver status acquisition unit 184 is designed so as to acquire, that is, receive, from the driver status detection unit 17, a face orientation, a sight direction, and a seating posture of a driver from among the driver statuses detected by the driver status detection unit 17.

The operation status determination unit 185 is provided so as to determine a status of driving operation by a driver. Specifically, the operation status determination unit 185 is designed so as to acquire, that is, receive, from the driver status detection unit 17, statuses related to the accelerator pedal 3, the brake pedal 4, and the steering wheel 8 from among the driver statuses detected by the driver status detection unit 17. Further, the operation status determination unit 185 is designed so as to acquire, that is, receive a status of a driver's input operation with the HMI device 20 from the HMI device 20. The operation status determination unit 185 is designed so as to determine a status of driving operation by the driver based on these results of acquisition.

The automatic operation level determination unit 186 is provided so as to determine an automatic operation level based on a running status acquired by the first vehicle information acquisition unit 181 and the like and a driving operation status determined by the operation status determination unit 185. A result of determination of an automatic operation level by the automatic operation level determination unit 186 will be hereafter referred to as "level information." The level information includes, for example, whether a level in progress, which is an automatic operation level presently in progress, can be continued and whether a transition from a level in progress to another automatic operation level can be made. Further, the level information includes, for example, a target level of transition and a point of planned transition or timing of planned transition in case of a transition from a level in progress to another automatic operation level. The driving control device 18 is provided so as to be capable of providing a result of level information determination by the automatic operation level determination unit 186 to each part, such as the HMI control device 26, via the in-vehicle communication line 10A.

The vehicle control unit 187 is provided so as to execute a vehicle motion control subtask corresponding to an automatic operation level. That is, the vehicle control unit 187 is designed so as to execute longitudinal and/or lateral motion control in the subject vehicle based on an automatic operation level determined by the automatic operation level determination unit 186.

The output command transmission unit 188 is provided so as to transmit output command information to the HMI control device 26 controlling the HMI device 20 and thereby cause the HMI device 20 to make level-related output related to the automatic operation levels. The level-related output includes execution-related output related to a status of execution of an automatic operation level and transition-related output related to a transition of an automatic operation level. The "execution-related output" is image display and/or voice output mainly for clearly indicating an automatic operation level in progress. The "transition-related output" is image display and/or voice out related to the termination of a level in progress and/or a transition to a target level of transition made when a transition is made from the level in progress to the target level of transition.

(HMI Device)

The HMI device 20 is provided so as to audiovisually present varied information related to the subject vehicle to a driver and accept a driver's input operation corresponding to the presented contents. In the present embodiment, the HMI device 20 mounted in the subject vehicle capable of automatic operation is configured so as to be capable of presenting varied information related to automatic operation and the like and accepting a driver's input operation. The "presentation of information" is, for example, various guides, various notifications, various alerts, an instruction to perform input operation, a notification of the contents of input operation, and the like.

As mentioned above, the HMI device 20 includes the meter panel 21, the HUD device 22, and the CID device 23 provided in the dashboard 7. That is, in the present embodiment, the HMI device 20 is configured as a so-called "dashboard HMI."

The meter panel 21 includes a meter 211, a meter display 212, and a meter switch 213. The meter 211 is provided so as to make meter display of a vehicle speed, an engine speed, a cooling water temperature, a fuel level, and the like of the subject vehicle.

The meter display 212 is an information display portion or an information display area provided at the central part of the meter panel 21 in the vehicle width direction and is provided so as to be capable of displaying varied information including date, ambient temperature, mileage, received radio station, and the like. In the present embodiment, the meter display 212 is configured as a display device as a liquid crystal display or an organic EL display having a displayable area substantially in a rectangular shape. EL is an abbreviation for electroluminescence. The meter switch 213 is provided so as to be capable of accepting various operations, such as a resetting operation with a trip meter, related to a status or contents of display in the meter 211 and/or the meter display 212.

The HUD device 22 is provided so as to display a display image including a character and/or a symbol in front of a driver. That is, the HUD device 22 is configured so as to use an AR technology to form a virtual display image in front of a driver and thereby superimposedly display a display image on the foreground including a road surface ahead of the traveling subject vehicle. Specifically, the HUD device 22 is designed so as to project display image light forming a display image to within a predetermined projection area PA in the front wind shield 9 to cause reflected light of the display image light from the front wind shield 9 to be visually recognized by a driver and thereby make AR display of the display image.

The CID device 23 is provided substantially at the central part of the dashboard 7 in the vehicle width direction. The CID device 23 is provided so as to be capable of displaying a navigation display screen for map display and route display by the navigation device 16. Further, the CID device 23 is provided so as to be capable of accepting display and input operation related to information and contents different from those in such a navigation display screen. Specifically, the CID device 23 is configured so as to be capable of accepting display and input operation related to driving modes including, for example, "comfort," "normal," "sports," "circuit," and the like.

The CID device 23 is provided so as to be capable of making display and accepting input operation related to second tasks available to a driver during automatic operation, that is, while the onboard system 10 is performing the autonomous driving function. The "second tasks" refer to tasks performed by a driver other than driving operation. Specifically, the second tasks include, for example, portable terminal operation, video contents viewing, and the like. The second task is also referred to as "extra-driving task" or "secondary activity." The CID device 23 is configured so as to enable video contents viewing as a second task to be made. The "video contents" are, for example, movies, concert video, music video, TV programs, and the like. The second tasks also include operation with the terminal device 25.

The CID device 23 includes a CID display 231, an input device 232, and a CID switch 233. The CID display 231 is provided substantially in the center position of the dashboard 7 in the vehicle width direction, that is, in a position between the driver's seat 2 and the passenger seat in such a manner that the CID display can be visually recognized at least by a driver. The CID display 231 is configured as a display device as a liquid crystal display or an organic EL display. In cases where a second task is video contents viewing, the CID display 231 is configured so as to display a picture of such video contents on the display device.

The input device 232 is a transparent touch panel and is provided so as to be laid over the CID display 231 to cover the CID display 231. That is, the input device 232 is configured so as to cause a display on the CID display 231 to be visually recognized by a driver or the like and be capable of accepting input operation by a driver or the like corresponding such a display. The CID switch 233 includes a plurality of manual operation switches disposed around the CID display 231 and the input device 232.

The speaker 24 is provided so as to provide varied information and/or entertainment through audio output in conjunction with display by the meter panel 21, the HUD device 22, or the CID device 23 or independently of display by these display devices. That is, the speaker 24 is configured so as to be capable of outputting an audio corresponding to display by these display devices. Further, the speaker 24 is configured so as to solely presenting information by voice separately from display by these display devices.

In addition to the meter switch 213 and the CID switch 233, the HMI device 20 includes a steering switch and the like. The steering switch is provided at a spoke portion or the like of the steering wheel 8. The HMI device 20 is provided so as to be capable of providing a result of acceptance of a driver's input operation to each part, such as the driving control device 18, via the in-vehicle communication line 10A.

(HMI Control Device)

The HMI control device 26 is configured as HCU that controls the operations of the meter panel 21, the HUD device 22, the CID device 23, and the like included in the HMI device 20. HCU is an abbreviation for HMI Control Unit.

The HMI control device 26 is configured as a so-called onboard microcomputer including CPU, ROM, a nonvolatile rewritable memory, RAM, input/output interface, and the like none of which is shown. The HMI control device 26 includes the following functional configurations or functional units implemented on the microcomputer. That is, the HMI control device 26 includes a second vehicle information acquisition unit 261, a second driving environment acquisition unit 262, a second traffic status acquisition unit 263, a second driver status acquisition unit 264, an automatic operation level acquisition unit 265, an output control unit 266, and an operation acceptance unit 267.

Like the first vehicle information acquisition unit 181 in the driving control device 18, the second vehicle information acquisition unit 261 is provided so as to acquire information related to a driving status of the subject vehicle. Specifically, the second vehicle information acquisition unit 261 is designed so as to acquire, from the vehicle status sensor 11, various quantities related to a driving status of the subject vehicle detected or acquired by the vehicle status sensor 11.

Like the first driving environment acquisition unit 182 in the driving control device 18, the second driving environment acquisition unit 262 is provided so as to acquire information related to a driving environment of the subject vehicle. Specifically, the second driving environment acquisition unit 262 is designed so as to acquire, from the outside status sensor 12, various quantities related to the natural environment around the subject vehicle detected or acquired by the outside status sensor 12. Further, the second driving environment acquisition unit 262 is designed so as to acquire a result of object detection by the periphery monitoring sensor 13 from the periphery monitoring sensor 13. Furthermore, the second driving environment acquisition unit 262 is designed so as to acquire, from the locator 14 and the navigation device 16, the present location and a planned traveling route of the subject vehicle and high-precision map information related to these items.

Like the first traffic status acquisition unit 183 in the driving control device 18, the second traffic status acquisition unit 263 as a "traffic status acquisition unit" according to the present disclosure is provided so as to acquire information related to a traffic status in a planned traveling route of the subject vehicle and in the vicinity thereof. Specifically, the second traffic status acquisition unit 263 is designed so as to acquire a traffic status in a section from the present location of the subject vehicle running in automatic operation in an automatic operation feasible section set as a limited domain on map information in advance to the end point of the automatic operation feasible section.

Like the first driver status acquisition unit 184 in the driving control device 18, the second driver status acquisition unit 264 is provided so as to acquire a driver status. Specifically, the second driver status acquisition unit 264 is designed so as to acquire, from the driver status detection unit 17, a face orientation, a sight direction, and a seating posture of a driver from among the driver statuses detected by the driver status detection unit 17.

The automatic operation level acquisition unit 265 is provided so as to acquire a result of determination of an automatic operation level at the driving control device 18. Specifically, the automatic operation level acquisition unit 265 is designed so as to acquire, that is, receive, from the driving control device 18, level information determined by the automatic operation level determination unit 186.

The output control unit 266 is provided so as to control image and/or voice output operation by the HMI device 20. That is, the output control unit 266 is configured so as to control image output and voice output through the meter panel 21, the HUD device 22, the CID device 23, and the speaker 24 and thereby present varied information to occupants of the subject vehicle including a driver. While a driver is performing a second task using the terminal device 25, the output control unit 266 is designed so as to cooperate with the terminal device 25 and thereby cause that terminal device 25 to present varied information.

Specifically, the output control unit 266 is configured so as to control output operation for level-related output by the HMI device 20 according to a result of determination of an automatic operation level by the driving control device 18, acquired at the automatic operation level acquisition unit 265. That is, the output control unit 266 is designed so as to control image display and/or voice output related to level information determined at the automatic operation level determination unit 186 in the driving control device 18.

The output control unit 266 as a "timing determination unit" according to the present disclosure is configured so as to determine change request timing based on a traffic status acquired by the second traffic status acquisition unit 263 and thereby alter change request timing according to a traffic status. The "change request timing" is timing of putting out a change request as transition-related output. The "change request" is image display and/or voice output requesting a driver to make a driving change from the autonomous driving function to the driver. The change request can also be referred to as "driving change request." In the present embodiment, the change request includes a change notification as a first change request and a change alert as a second change request put out after the change notification. Concrete examples of determination or alteration of change request timing will be described later in Overview of Operation.

The operation acceptance unit 267 is provided so as to accept input operation by occupants of the subject vehicle including a driver with the HMI device 20. Specifically, the operation acceptance unit 267 is designed so as to monitor a status or a result of acceptance of input operation with the meter switch 213, the input device 232, the CID switch 233, the terminal device 25, or the like corresponding to varied information presented by the output control unit 266.

(Overview of Operation)

Hereafter, a description will be given to the operations of the driving control device 18 and the HMI control device 26 according to the present embodiment and an overview of a method and a program executed by these devices as well as an effect brought about by the present embodiment.

In the driving control device 18, the first vehicle information acquisition unit 181 acquires information (for example, traveling speed and the like) related to a driving status of the subject vehicle. The first driving environment acquisition unit 182 acquires information related to a driving environment of the subject vehicle. The first traffic status acquisition unit 183 acquires information related to a traffic status. The first driver status acquisition unit 184 acquires a face orientation, a sight direction, and a seating posture of a driver.

The operation status determination unit 185 acquires a result of detection at the driver status detection unit 17 from the driver status detection unit 17. The results of detection include a status of placement of a driver's foot on the accelerator pedal 3, the brake pedal 4, and the footrest 5, a status of operation with the accelerator pedal 3 and the brake pedal 4, a status of grasping on and a status of operation with the steering wheel 8, and the like. The operation status determination unit 185 acquires, from the HMI device 20, a status of a driver's input operation with the HMI device 20, including a status of execution of a second task. The operation status determination unit 185 determines a status of the driver's driving operation based on a result of detection at the driver status detection unit 17 and a status of the driver's input operation with the HMI device 20.

The automatic operation level determination unit 186 determines level information related to an automatic operation level implemented by the onboard system 10. Specifically, the automatic operation level determination unit 186 determines a condition of permission for an automatic operation level equivalent to any of Levels 1 to 3 based on a running status acquired by the first vehicle information acquisition unit 181 or the like. When a predetermined condition of permission for an automatic operation level holds, the automatic operation level determination unit 186 determines that automatic operation level to be feasible. When a predetermined starting condition, including a driver' approving operation, holds, the automatic operation level determination unit 186 determines implementation of that automatic operation level.

Further, the automatic operation level determination unit 186 determines a continuing condition or a terminating condition of a level in progress based on a running status acquired by the first vehicle information acquisition unit 181 or the like. When the continuing condition does not hold or when the terminating condition holds, the automatic operation level determination unit 186 determines a termination of the level in progress, a target level of transition, and a point of planned transition or timing of planned transition. The details of processing performed when a target level of transition is determined or a transition to that level is made are identical with the details of processing using the above-mentioned permitting condition and starting condition.

The vehicle control unit 187 executes vehicle speed control, steering control, braking control, or the like based on level information determined by the automatic operation level determination unit 186. The output command transmission unit 188 transmits output command information to the HMI control device 26 controlling the HMI device 20 and thereby causes the HMI device 20 to make level-related output as information output related to the automatic operation levels.

As a result, the HMI device 20 notifies occupants of the subject vehicle including a driver of information related to an automatic operation level in progress or to be implemented by image display and/or voice. Specifically, the HMI device 20 displays a level in progress via the meter display 212 or the like. When automatic operation becomes feasible, the HMI device 20 displays that automatic operation has become feasible and an instruction to perform approving operation for accepting approving operation for starting automatic operation by voice output as well as via the meter display 212 or the like.

As mentioned above, the HMI control device 26 controls image display and/or voice output at the HMI device 20 to present information related to execution of a predetermined automatic operation level or transition of an automatic operation level to occupants of the subject vehicle including a driver. As a result, the occupants of the subject vehicle including the driver can easily take an action or a position corresponding to implementation of the predetermined automatic operation level or transition of the automatic operation level. For this reason, the HMI control device 26 can be evaluated as a "driving assistance device" configured so as to assist driving of the subject vehicle having the autonomous driving function.

During automatic operation, a driver is not obligated to monitor the periphery of the subject vehicle or take other like actions until a change request or a driving intervention request is made by the onboard system 10. Further, a driver is not requested to perform steering control operation or acceleration/deceleration control operation until a change request or a driving intervention request is made.

For this reason, during automatic operation, a driver is not requested to take a driving position corresponding to Levels 0 to 2. The "driving positions" include driving posture and driving awareness. The "driving posture" is a driver's riding posture and includes a seating posture at the driver's seat 2, a positional relation between a foot and the accelerator pedal 3 or the like, a status of grasping on and operating with the steering wheel 8, a sight direction, and the like. The "driving awareness" is a driver's mental state and includes a status of recognition of a running status of the subject vehicle. A sight direction can be included also in "driving awareness." A level of driving awareness with which a level of a status of a driver's awareness or monitoring of a running status of the subject vehicle is high and a lower automatic operation level can be coped with will be hereafter described as "driving awareness is high." Meanwhile, when a driver's awareness is away from driving, that is, a running status of the subject vehicle, "driving awareness is low."

While a change request or a driving intervention request is not made and automatic operation is being stably performed by the onboard system 10, a driver is not requested to constantly grasp the steering wheel 8. Further, a driver is not requested, either, to constantly hold a driving posture to extent that the accelerator pedal 3 and the brake pedal 4 can be operated anytime. Further, a driver's awareness may depart from a running status of the subject vehicle until a change request or a driving intervention request is made by the onboard system 10. Therefore, a driver can freely perform or utilize a second task as long as automatic operation is being stably performed by the onboard system 10.

When a terminating condition of automatic operation holds or a continuing condition fails to hold during automatic operation, the automatic operation level determination unit 186 determines termination of the automatic operation. The automatic operation level determination unit 186 determines a feasible target level of transition based on a running status acquired by the first vehicle information acquisition unit 181 or the like.

Then, the vehicle control unit 187 executes vehicle speed control, steering control, braking control, or the like according to a mode of transition of the automatic operation level determined by the automatic operation level determination unit 186. The output command transmission unit 188 transmits output command information to the HMI control device 26 and thereby causes the HMI device 20 to make transition-related output related to transition of the automatic operation level.

Specifically, for example, when an automatic operation feasible section set on map information as a limited domain in advance ends, an automatic operation level transitions from automatic operation to a lower level (for example, manual operation or the like). At this time, a driving change from the autonomous driving function to a driver is required.

When a driving change is made, a driver is required to take an appropriate driving posture suitable for a target level of transition and enhance his/her driving awareness before the subject vehicle arrives at the end point of the automatic operation feasible section. Meanwhile, as mentioned above, a driver's driving position and driving awareness is probably different from a driving position corresponding to Levels 0 to 2 during automatic operation. For this reason, the onboard system 10 must ensure a sufficient time allowance to make a change request requesting a driver to make a driving change.

With respect to the foregoing, a change request could be made, for example, at a predetermined driving change start point a predetermined distance (for example, 1 to several km) before the end point of an automatic operation feasible section. However, for example, a traffic jam may have occurred in an automatic operation traveling section between the present location of the subject vehicle and the end point of the automatic operation feasible section. If a change request is made to start a driving change at the above-mentioned predetermined driving change start point in this case, a driver may be compelled to drive in the traffic jam for a relatively long time after he/she takes a predetermined driving position as the result of the driving change.

For automatic operation in an automatic operation feasible section, a traveling speed of the subject vehicle can be relatively freely set within a speed limit range. In this regard, a driver's degree of psychological composure at the time of a driving change largely differs, for example, between when a traveling speed is near the upper limit of a speed limit range and when the traveling speed is near the lower limit.

Further, a time required for a driving change can differ depending on a target level of transition. For example, in the case of transition from automatic operation to manual operation, a degree of change in driving position is larger than in the case of transition from automatic operation to Level 2. For this reason, in the case of transition from automatic operation to manual operation, a larger time allowance for driving change is preferably ensured than in the case of transition from automatic operation to Level 2.

Therefore, if a change request is uniformly made relative to a distance to the end point of an automatic operation feasible section, an inconvenience can conversely occur. In the present embodiment, consequently, the onboard system 10 sets change request timing in accordance with the present running status of the subject vehicle including a traffic status. A specific description will be given. The onboard system 10 acquires a traffic status in a section from the present location of the subject vehicle running in automatic operation in an automatic operation feasible section to the end point of the automatic operation feasible section. The onboard system 10 alters change request timing according to the acquired traffic status. As a result, a driving change is notified of or started with appropriate timing.

In detail, the output control unit 266 in the HMI control device 26 determines change request timing based on a traffic status acquired by the second traffic status acquisition unit 263 and thereby alters the change request timing according to the traffic status. The output control unit 266 determines change request timing based on the automatic operation level of a target level of transition to which transition is made from automatic operation as the result of a driving change and thereby alters the change request timing according to the target level of transition. Specifically, the output control unit 266 advances change request timing more with reduction in the automatic operation level of a target level of transition.

The output control unit 266 determines change request timing based on a traveling speed of the subject vehicle and thereby alters change request timing according to the traveling speed. Specifically, when in a traffic jam, the output control unit 266 delays change request timing as compared with when not in a traffic jam. Further, the output control unit 266 advances change request timing more with increase in traveling speed of the subject vehicle. Furthermore, when a driver is performing a second task during running in automatic operation, the output control unit 266 advances change request timing more than when the driver is not performing a second task.

Figure 3:
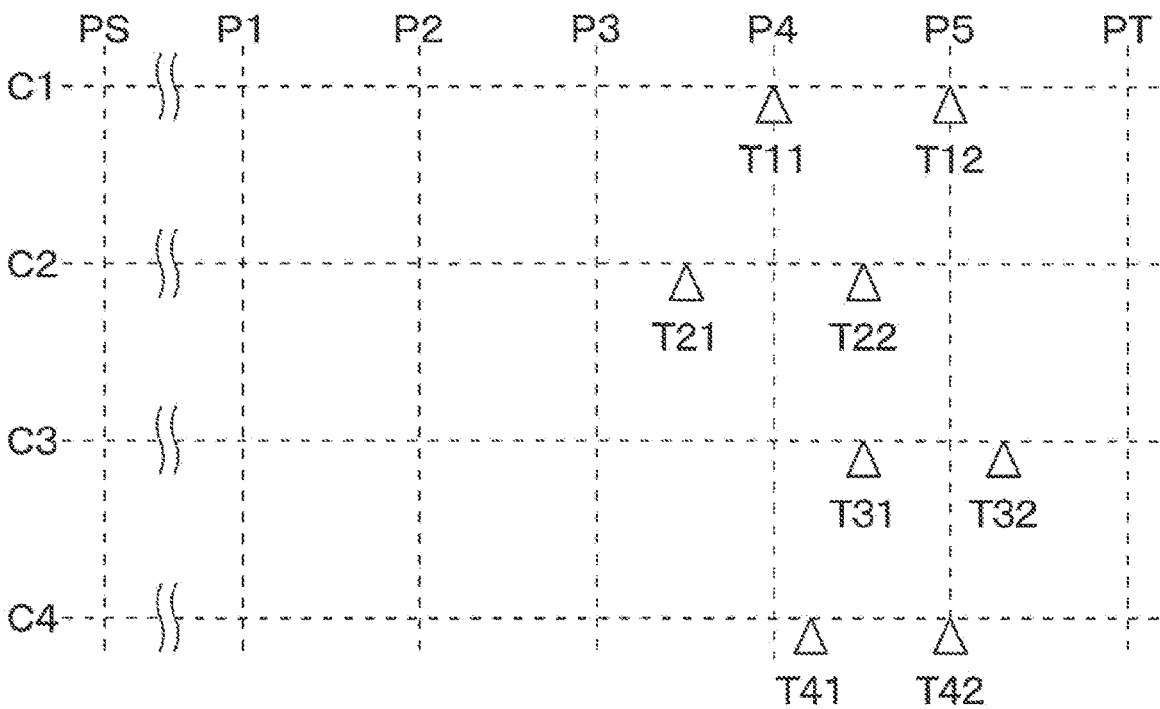
FIG. 3 is a conceptual rendering illustrating a mode of altering change request timing according to an embodiment.
Figure 4:
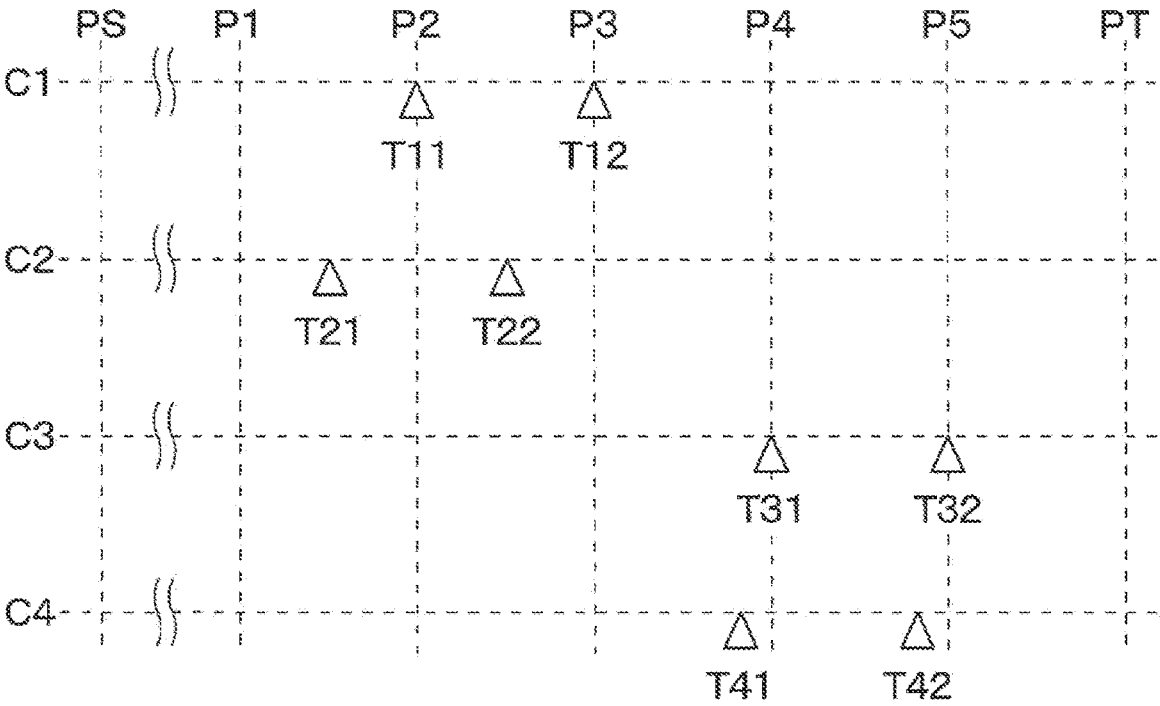
FIG. 4 is a conceptual rendering illustrating a mode of altering change request timing according to an embodiment.

FIG. 3 and FIG. 4 illustrate concrete examples of determination or alteration of change request timing according to the present embodiment. FIG. 3 shows a first example of a case where a target level of transition is Level 2, that is, advanced driving assistance. FIG. 4 shows a second example of a case where a target level of transition is Level 0, that is, manual operation. In the drawings, PS indicates a point at which the subject vehicle starts automatic operation and PT indicates the end point of an automatic operation feasible section. P1 to P5 indicate points obtained by dividing a distance to the end point PT of the automatic operation feasible section by a predetermined distance, specifically, 500 m.

That a traffic jam has occurred in an automatic operation traveling section between the present location of the subject vehicle and the end point PT of the automatic operation feasible section will be hereafter referred to as "under congestion." Meanwhile, that any traffic jam has not occurred in such a section will be hereafter referred to as "under non-congestion." Case C1 indicates a case where under non-congestion, the subject vehicle is normally driving, that is, a traveling speed of the subject vehicle is substantially in the middle (for example, 80 km/h) between the upper limit and the lower limit of a speed limit range. Case C2 indicates a case where under non-congestion, the subject vehicle is driving at high speed, that is, a traveling speed of the subject vehicle is at the near upper limit (for example, 98 km/h) of a speed limit range. Case C3 indicates a case where under congestion, a driver is not performing a second task. Case C4 indicates a case where under congestion, a driver is performing a second task.

T11, T12 . . . respectively indicate change request times. In "Tαβ," α is any of 1 to 4 and β is 1 or 2. α corresponds to Cases C1 to C4. β=1 indicates change notification and β=2 indicates change alert. That is, "T21" indicates a change notification time in Case C2 and "T32" indicates a change alert time in Case C3.

Consideration will be given to cases where the subject vehicle is normally driving under non-congestion (that is, Case C1). In the first example in which a target level of transition is advanced driving assistance, referring to FIG. 3, a point whose distance to the end point PT is 1000 m is set as change notification time T11. A point whose distance to the end point PT is 500 m is set as change alert time T12.

Meanwhile, in the second example in which a target level of transition is manual operation, referring to FIG. 4, a point whose distance to the end point PT is 2000 m is set as change notification time T11. A point whose distance to the end point PT is 1500 m is set as change alert time T12.

Consideration will be given to cases where the subject vehicle is driving at high speed under non-congestion (that is, Case C2). In the first example in which a target level of transition is advanced driving assistance, referring to FIG. 3, a point whose distance to the end point PT is 1250 m is set as change notification time T21. A point whose distance to the end point PT is 750 m is set as change alert time T22.

Meanwhile, in the second example in which a target level of transition is manual operation, referring to FIG. 4, a point whose distance to the end point PT is 2250 m is set as change notification time T21. A point whose distance to the end point PT is 1750 m is set as change alert time T22.

Consideration will be given to a case where a second task is not being performed under congestion (that is, Case C3). In the first example in which a target level of transition is advanced driving assistance, referring to FIG. 3, a point whose distance to the end point PT is 750 m is set as change notification time T31. A point whose distance to the end point PT is 350 m is set as change alert time T32.

Meanwhile, in the second example in which a target level of transition is manual operation, referring to FIG. 4, a point whose distance to the end point PT is 1000 m is set as change notification time T31. A point whose distance to the end point PT is 500 m is set as change alert time T32.

Consideration will be given to cases where a second task is being performed under congestion (that is, Case C4). In the first example in which a target level of transition is advanced driving assistance, referring to FIG. 3, a point whose distance to the end point PT is 900 m is set as change notification time T41. A point whose distance to the end point PT is 500 m is set as change alert time T42.

Meanwhile, in the second example in which a target level of transition is manual operation, referring to FIG. 4, a point whose distance to the end point PT is 1100 m is set as change notification time T41. A point whose distance to the end point PT is 600 m is set as change alert time T42.

According to the present embodiment, as mentioned above, change request timing is set according to a target level of transition. That is, change request timing is advanced more with reduction in the automatic operation level of a target level of transition. Specifically, for example, change request timing is advanced more in the second example in which a target level of transition is manual operation than in the first example in which a target level of transition is advanced driving assistance. As a result, a change request can be made with appropriate timing corresponding to the automatic operation level of a target level of transition.

According to the present embodiment, change request timing is set according to a traveling speed of the subject vehicle. Specifically, change request timing is advanced more in Case C2 in which the subject vehicle is driving at high speed than in Case C1 in which the subject vehicle is normally driving. Meanwhile, change request timing is delayed more in Case C3 and Case C4 in which the subject vehicle is under congestion than in Case C1 and Case C2 in which the subject vehicle is under non-congestion. As a result, a change request can be made with appropriate timing corresponding to a driving status of or a traffic status around the subject vehicle.

According to the present embodiment, change request timing is advanced more in Case C4 in which a second task is being performed under congestion than in Case C3 in which a second task is not being performed. As a result, a change request is made with appropriate timing corresponding to a driver status during driving in automatic operation.

(Example of Operation)

Figure 5:
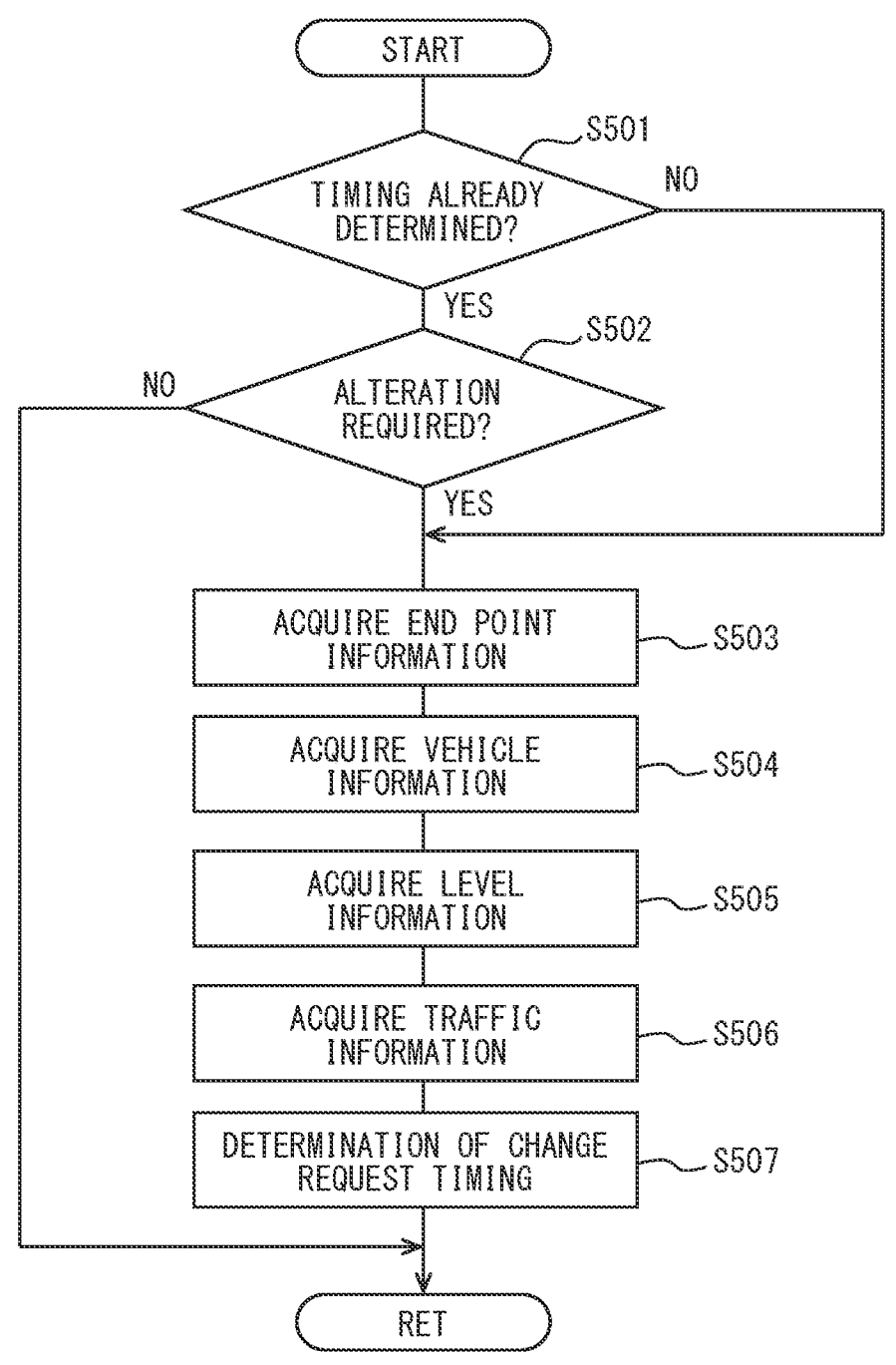
FIG. 5 is a flowchart illustrating a change request timing determination operation according to an embodiment.
Figure 6:
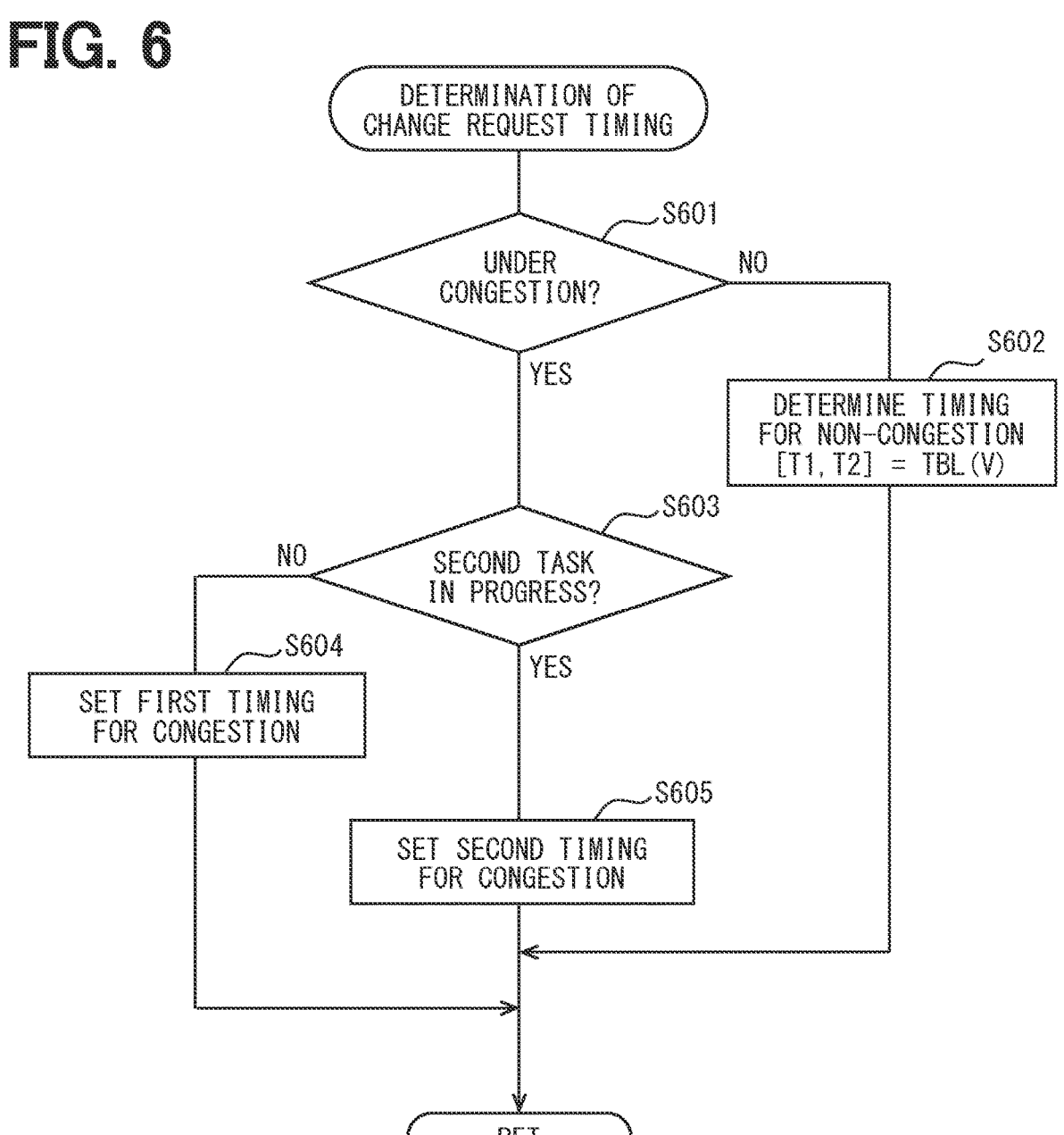
FIG. 6 is a flowchart illustrating a change request timing determination operation according to an embodiment.

FIG. 5 and FIG. 6 are flowcharts illustrating determination operation for change request timing according to the present embodiment. In the drawings, "S" is an abbreviation for "Step."

In the present embodiment, the CPU provided in the HMI control device 26 performs routines corresponding to the flowcharts shown in FIG. 5 and FIG. 6. Specifically, the routine corresponding to the flowchart shown in FIG. 5 is repeatedly performed at predetermined time intervals after the subject vehicle arrives at the point P1 indicated in FIG. 3 and FIG. 4. The CPU, ROM, nonvolatile rewritable memory, and RAM provided in the HMI control device 26 will be hereafter simply referred to as "CPU," "ROM," "nonvolatile memory," and "RAM," respectively.

When a startup time has come, the CPU reads the routine corresponding to the flowchart shown in FIG. 5 from the ROM or the nonvolatile memory and launches the routine.

When the routine is launched, at Step 501, first, the CPU determines whether change request timing has been already determined.

In cases where the routine is launched for the first time when the subject vehicle arrives at the point P1 shown in FIG. 3 and FIG. 4, change request timing has not been determined yet. In this case (that is, Step 501=NO), the CPU skips Step 502 and causes the processing to proceed to Step 503 to Step 507.

Meanwhile, in cases where the subject vehicle has already passed through the point P1 shown in FIG. 3 and FIG. 4 at the present point of time and the routine has been already launched at least once, change request timing has been already determined. In this case (that is, Step 501=YES), the CPU causes the processing to proceed to Step 502.

After change request timing is once determined, a running status can largely vary (for example, a traffic jam is eliminated). At Step 502, consequently, the CPU determines whether the determined change request timing need be altered.

When the CPU determines that the determined change request timing need be altered (that is, Step 502=YES), the CPU causes the processing to proceed to Step 503 to Step 507. Meanwhile, when the determined change request timing need not be altered (that is, Step 502=NO), the CPU skips the processing of Step 503 to Step 507 and terminates the routine once.

At Step 503, the CPU acquires end point information and temporarily stores the information in the RAM. The end point information is map information related to the end point PT of an automatic operation feasible section in which the subject vehicle is presently driving in automatic operation. The processing of Step 503 corresponds to a function of the second driving environment acquisition unit 262.

At Step 504, the CPU acquires information related to a driving status of the subject vehicle. The processing of Step 504 corresponds to a function of the second vehicle information acquisition unit 261.

At Step 505, the CPU acquires level information. The processing of Step 505 corresponds to a function of the automatic operation level acquisition unit 265.

At Step 506, the CPU acquires a traffic status in a section between the present location of the subject vehicle and the end point PT. The processing of Step 506 corresponds to a function of the automatic operation level acquisition unit 265.

At Step 507, the CPU determines change request timing based on results of acquisition at Step 503 to Step 506. The processing of Step 507 corresponds to a function of the output control unit 266.

The subroutine shown in FIG. 6 corresponds to the change request timing determination processing at Step 507 shown in FIG. 5. In the subroutine, at Step 601, first, the CPU determines whether the subject vehicle is under congestion.

When the subject vehicle is under non-congestion (that is, Step 601=NO), the CPU performs the processing of Step 602 and then terminates the subroutine once. At Step 602, the CPU determines change request timing, that is, change notification time T1 and change alert time T2 according to a table in which a traveling speed V is taken as a parameter.

When the subject vehicle is under congestion (that is, Step 601=YES), the CPU causes the processing to proceed to Step 603. At Step 603, the CPU determines whether a second task is being performed. When a second task is not being performed (that is, Step 603=NO), the CPU performs the processing of Step 604 and then terminates the subroutine once. At Step 604, the CPU sets first timing for congestion as change request timing. The first timing for congestion corresponds to change notification time T31 and change alert time T32 indicated in FIG. 3 and FIG. 4.

When a second task is being performed (that is, Step 603=YES), the CPU performs the processing of Step 605 and then terminates the subroutine once. At Step 605, the CPU sets second timing for congestion for change request timing. The second timing for congestion corresponds to change notification time T41 and change alert time T42 indicated in FIG. 3 and FIG. 4.

(Modifications)

The present disclosure is not limited to the above-mentioned embodiment. Therefore, the embodiment can be modified as appropriate. Hereafter, a description will be given to typical modifications. The following description of modifications will be given mainly to a difference from the above-mentioned embodiment. In the descriptions of the above embodiment and the modifications, identical reference numerals and symbols are given to identical or equivalent items. Therefore, in the following description of the modifications, the description of the above embodiment can be applied to components having the same reference numerals and symbols as those of the above embodiment as appropriate unless a technical contradiction arises or any additional description is specially given.

The present disclosure is not limited to concrete device configurations described in relation to the above embodiment at all. For example, the vehicle 1 equipped with the onboard system 10 is not limited to an ordinary-sized motor vehicle. Specifically, such a vehicle 1 may be such a heavy duty vehicle as a truck. Any special limitation is not imposed on a number of wheels of the vehicle 1, either and the vehicle 1 may be a three-wheeled vehicle or may be such a six-wheeled or eight-wheeled vehicle as a truck. A type of the vehicle 1 may be a conventional vehicle equipped with only an internal combustion engine, may be an electric vehicle or a fuel cell electric vehicle equipped with no internal combustion engine, or may be a so-called hybrid vehicle. A shape or a structure of the vehicle body of the vehicle 1 is not limited to a box shape, that is, substantially a rectangular shape as viewed in a plane, either. Usage of the vehicle 1, a position of the steering wheel 8, a number of occupants, or the like is not specially limited, either.

For a telecommunications standard constituting the onboard system 10, any other standard than CAN (international trademark registration), for example, FlexRay (international trademark registration) or the like is also adoptable. A telecommunications standard constituting the onboard system 10 is not limited to one type. For example, the onboard system 10 may include a subnetwork line conforming to such a telecommunications standard as LIN. LIN is an abbreviation for Local Interconnect Network.

The vehicle status sensor 11, the outside status sensor 12, or the periphery monitoring sensor 13 is not limited to the above-mentioned examples, either. For example, the periphery monitoring sensor 13 may be configured to include a sonar, that is, an ultrasonic sensor. Or, the periphery monitoring sensor 13 may include two or more types of sensors from among a millimeter wave radar sensor, a submillimeter wave radar sensor, a laser radar sensor, and an ultrasonic sensor. There is not special limitation on a number of installed sensors of various types, either.

The locator 14 is not limited to the above-mentioned examples, either. For example, the locator 14 need not be configured to incorporate a gyro sensor or an acceleration sensor. Specifically, the inertia acquisition unit 142 may be designed so as to receive output signals from an angular velocity sensor and an acceleration sensor provided as the vehicle status sensor 11 outside the locator 14.

The DCM 15 can be omitted. That is, traffic information can be acquired by the navigation device 16. Or, the navigation device 16 may be configured to include the locator 14 and the DCM 15.

The navigation device 16 may be information-communicably connected with the HMI control device 26 via a sub-communication line different from the in-vehicle communication line 10A.

The navigation device 16 may include a display screen dedicated to navigation screen display different from the HMI device 20. Or, the navigation device 16 may be provided as a component constituting a part of the HMI device 20. Specifically, for example, the navigation device 16 may be integrated with the CID device 23.

The driver status detection unit 17 may be information-communicably connected with the HMI control device 26 via a sub-communication line different from the in-vehicle communication line 10A.

In the above-mentioned embodiment, the driving control device 18 is configured so as to be capable of performing vehicle control operation corresponding to Levels 1 to 3. However, the present disclosure is preferably applicable to cases where vehicle control operation corresponding to Levels 1 to 5 can be performed.

The levels or categories of automatic operation in the present disclosure is not limited to "SAE J3016," either. A specific description will be given. The "SAE J3016" prescribes that a numeric value of level is increased with increase in automatic operation level. However, the present disclosure is not limited to this mode. That is, for example, the present disclosure is similarly applicable also to a standard in which the highest automatic operation level is taken as "Level 1" and a numeric value of level is increased with reduction in automatic operation level.

The HMI device 20 need not be configured to include the meter panel 21, the HUD device 22, and the CID device 23. That is, for example, the meter panel 21 and the CID device 23 can be integrated with each other.

The meter 211 and the meter display 212 can be implemented by a single display device. In this case, the meter 211 can be provided as a display area at both the left and right end portions of a single display device that is a liquid crystal or an organic EL display. That is, the meter 211 can be implemented by displaying images of a bezel, a pointer, a scale, and the like equivalent to a tachometer, a speed meter, a water temperature meter, and the like. Further, the meter display 212 can be provided as a display area other than the meter 211 in such a display device.

The input device 232 may include a pointing device or the like operated at hand of a driver in place of the touch panel laid over the CID display 231 or together with the touch panel. The input device 232 may include a voice input device detecting a driver's speech.

The present disclosure is not limited to a concrete functional configuration or an example of operation described in relation to the above embodiment at all. For example, the first vehicle information acquisition unit 181 may be designed so as to receive information related to a driving status of the subject vehicle, acquired at the second vehicle information acquisition unit 261, from the HMI control device 26 via the in-vehicle communication line 10A. This is also the same with the first driving environment acquisition unit 182, the first traffic status acquisition unit 183, and the first driver status acquisition unit 184.

Similarly, the second vehicle information acquisition unit 261 may be designed so as to receive information related to a driving status of the subject vehicle, acquired at the first vehicle information acquisition unit 181, from the driving control device 18 via the in-vehicle communication line 10A. This is also the same with the second driving environment acquisition unit 262, the second traffic status acquisition unit 263, and the second driver status acquisition unit 264.

The "driving assistance device" according to the present disclosure may be provided in the driving control device 18, may be provided in the HMI control device 26, or may be provided astride both the devices. That is, some of the components constituting the present disclosure may be provided in the driving control device 18 and the other may be provided in the HMI control device 26. In other words, the "driving assistance device" according to the present disclosure can be implemented by the driving control device 18 and the HMI control device 26 cooperating with each other.

In cases where the "driving assistance device" according to the present disclosure is provided in the driving control device 18, the first traffic status acquisition unit 183 is equivalent to the "traffic status acquisition unit" according to the present disclosure and the automatic operation level determination unit 186 or the output command transmission unit 188 is equivalent to the "timing determination unit" according to the present disclosure. In this case, the automatic operation level determination unit 186 or the output command transmission unit 188 is designed so as to alter change request timing according to a traffic status acquired by the first traffic status acquisition unit 183. Then, the CPU provided in the driving control device 18 performs routines corresponding to the flowcharts shown in FIG. 5 and FIG. 6.

In the above-mentioned embodiment, the driving control device 18 and the HMI control device 26 are configured as a so-called onboard microcomputer including CPU and the like. However, the present disclosure is not limited to such a configuration.

For example, all or part of the driving control device 18 may be configured to include a digital circuit, for example, ASIC or FPGA configured so as to capable of performing the above-mentioned operations. ASIC is an abbreviation for Application Specific Integrated Circuit. FPGA is an abbreviation for Field Programmable Gate Array. That is, in the driving control device 18, an onboard microcomputer portion and a digital circuit portion can be concomitant with each other. This is also the same with the HMI control device 26.

A program according to the present disclosure that can perform various operations, procedures, or processing described in relation to the above embodiment can be downloaded or upgraded via V2X communication through the DCM 15 or the like. V2X is an abbreviation for Vehicle to X. Or, such a program can be downloaded or upgraded via terminal equipment provided at a manufacturing factory, a maintenance factory, a dealer, or the like of the vehicle 1. A storage destination for such a program may be a memory card, an optical disk, a magnetic disk, or the like.

As mentioned above, each of the above-mentioned functional configurations and methods may be implemented by a dedicated computer provided by configuring a processor and a memory programmed to perform one or more functions reduced to practice by a computer program. Or, each of the above-mentioned functional configurations and methods may be implemented by a dedicated computer provided by configuring a processor with one or more dedicated hardware logic circuits.

Alternatively, each of the above-mentioned functional configurations and methods may be implemented by one or more dedicated computers configured of a combination of a processor and a memory programmed to perform one or more functions and a processor configured of one or more hardware logic circuits. A computer program may be stored in a computer-readable non-transitory tangible storage medium as an instruction to be executed by a computer. That is, each of the above-mentioned functional configurations and methods can also be represented as a computer program including a procedure for reducing those functional configurations and methods to practice or a non-transitory tangible storage medium with that program stored therein.

In the above concrete examples shown in FIG. 3 and FIG. 4, change request timing is set according to a distance to the end point of an automatic operation feasible section. However, the present disclosure is not limited to this mode. That is, change request timing may be set according to a time required for arrival at the end point of an automatic operation feasible section. In other words, in FIG. 3 and FIGS. 4, P1 to P5 may be what indicates an estimated value of a time required for arrival at the end point PT.

A mode of setting change request timing is not limited to the above-mentioned concrete examples shown in FIG. 3 and FIG. 4, either. That is, for example, change request timing may be identical in Case C1 and Case C2. Similarly, change request timing may be identical in Case C3 and Case C4.

Change request timing under congestion may be alterable according to a traveling speed of the subject vehicle. Or, change request timing under congestion may be included in setting of change request timing according to a traveling speed of the subject vehicle. That is, determination of whether the subject vehicle is under congestion can be omitted by use of a table containing a traveling speed V under congestion.

Change alert time T12 and change alert time T22 may substantially agree with each other. Similarly, change alert time T32 and change alert time T42 may substantially agree with each other.

Similar expressions of "acquisition," "computation," "estimation," "detection", "sensing," "determination", and the like can be replaced with one another as appropriate unless a technical contradiction arises. "Detection" or "sensing" and "extraction" can also be replaced with each other unless a technical contradiction arises.

Each element constituting the above embodiment is not always indispensable unless the element is explicitly specified as indispensable or the element is clearly considered to be indispensable on principles, needless to add. When a numeric value, such as a number of components, a quantity, and a range, is referred to, the present disclosure is not limited to that specific numeric value unless the specific numeric value is explicitly specified as indispensable or the specific numeric value is clearly definitive on principles. Similarly, when a shape, a direction, a positional relation, or the like of a component or the like is referred to, the present disclosure is not limited to the shape, direction, positional relation, or the like unless the shape, direction, positional relation, or the like is explicitly specified as indispensable or the shape, direction, positional relation, or the like is definitive on principles.

Modifications are not limited to the above-mentioned examples, either. For example, all or part of one of a plurality of embodiments and all or part of another can be combined with each other unless a technical contradiction arises. Any special limitation is not imposed on a number of combined elements, either. Similarly, all or part of one of a plurality of modifications and all or part of another can be combined with each other unless a technical contradiction arises. Further, all or part of the above-mentioned embodiment and all or part of any of the above-mentioned modifications can be combined with each other unless a technical contradiction arises.

(Driving Assistance Program)

The present disclosure described based on the above embodiment and modifications includes the following aspects related to a driving assistance program. The following individual aspects can be combined with one another when applied unless a technical contradiction arises.

The driving assistance program according to the present disclosure is a program executed by the driving assistance device (18; 25) configured so as to assist the driving of the vehicle (1) having an autonomous driving function. The driving assistance method that is a method for assisting the driving of the above-mentioned vehicle is practiced by executing this program by the above-mentioned driving assistance device.

According to a first aspect, the processing performed by the above-mentioned driving assistance device includes:

traffic status acquisition processing of acquiring a traffic status in a section between the present location of the vehicle driving in automatic operation in an automatic operation feasible section set on map information as a limited domain in advance and the end point of the automatic operation feasible section; and timing determination processing of altering change request timing that is timing of making a change request requesting a driver to make a driving change from the autonomous driving function to the driver according to the traffic status acquired through the traffic status acquisition processing.

According to a second aspect, the timing determination processing is processing of altering the change request timing according to an automatic operation level to which transition is made from automatic operation by the driving change.

According to a third aspect, the timing determination processing advances the change request timing more with reduction in the automatic operation level to which transition is made.

According to a fourth aspect, the change request timing is set according to a distance to or a time required for arrival at the end point.

According to a fifth aspect, the timing determination processing alters the change request timing according to a traveling speed of the vehicle.

According to a sixth aspect, the timing determination processing advances the change request timing more when the driver is performing a second task during driving in the automatic operation than when the driver is not performing.

According to a seventh aspect, the change request includes a first change request and a second change request made after the first change request.

What is claimed is:

1. A driving assistance device configured to assist driving of a vehicle having an autonomous driving function, the driving assistance device comprising:

a processor and a memory configured to acquire a traffic status in a section between a present location of the vehicle, which drives in automatic operation in an automatic operation feasible section, and an end point of the automatic operation feasible section, the automatic operation feasible section being set as a limited domain in advance on map information; and alter change request timing, at which a change request is made to request a driver to make a driving change from the autonomous driving function to the driver, according to the traffic status acquired, wherein the processor is configured to determine whether the vehicle is under congestion, determine whether the driver performs a second task, set, based on a result of determination whether the vehicle is under congestion and a result of determination whether the driver performs the second task, the change request timing, in a state where the vehicle is under congestion and where the driver performs the second task, differently from the change request timing in a state where the vehicle is under congestion and where the driver does not perform the second task, and delay the change request timing when determining that the vehicle is under congestion, as compared with the change request timing when determining that the vehicle is under non-congestion, the driving assistance device further comprising:

a vehicle control unit configured to execute a longitudinal and/or lateral motion control of the vehicle, when the vehicle drives in the automatic operation.

2. The driving assistance device according to claim 1, wherein the processor is configured to alter the change request timing according to an automatic operation level to which transition is made from the automatic operation by the driving change.

3. The driving assistance device according to claim 2, wherein the processor is configured to advance the change request timing more with reduction in the automatic operation level.

4. The driving assistance device according to claim 1, wherein the change request timing is set according to a distance to or a time required for arrival at the end point.

5. The driving assistance device according to claim 1, wherein the processor is configured to alter the change request timing according to a traveling speed of the vehicle.

6. The driving assistance device according to claim 1, wherein the processor is configured to advance the change request timing more when the driver performs the second task in driving in the automatic operation than when the driver does not perform the second task.

7. The driving assistance device according to claim 1, wherein the change request includes a first change request and a second change request, which is made after the first change request.

8. The driving assistance device according to claim 1, wherein the processor is configured to acquire congestion information including a location of a congested section, and determine whether the vehicle is under congestion based on the location of the congested section.

9. The driving assistance device according to claim 1, wherein the congestion refers to a state in which a motorcade repeatedly running at low speed not more than a threshold speed or stopping and taking off continues to a predetermined extent.

10. The driving assistance device according to claim 9, wherein the threshold speed is 20 km/h on an arterial road and 40 km/h on a highway.

11. The driving assistance device according to claim 9, wherein the predetermined extent is 1 km or longer and 15 minutes or longer.

12. The driving assistance device according to claim 1, further comprising:

an automatic operation level acquisition unit configured to acquire an automatic operation level in the automatic operation, and an output control unit configured to control output operation for level-related output by an HMI device according to the automatic operation level.

13. The driving assistance device according to claim 1, further comprising:

the vehicle control unit is configured to execute the longitudinal and/or lateral motion control of the vehicle by outputting a signal to an accelerator device and/or a steering device.

14. A non-transitory computer readable medium for a driving assistance device, which is configured to assist driving of a vehicle having an autonomous driving function, the non-transitory computer readable medium storing a driving assistance program including instructions configured to, when executed by at least one processor of the driving assistance device, cause the at least one processor to implement:

acquiring a traffic status in a section between a present location of the vehicle, which drives in an automatic operation in an automatic operation feasible section, and an end point of the automatic operation feasible section, the automatic operation feasible section being set as a limited domain in advance on map information; and altering change request timing, at which a change request is made to request a driver to make a driving change from the autonomous driving function to the driver, according to the traffic status acquired, wherein the processor is configured to determine whether the vehicle is under congestion, determine whether the driver performs a second task, set, based on a result of determination whether the vehicle is under congestion and a result of determination whether the driver performs the second task, the change request timing, in a state where the vehicle is under congestion and where the driver performs the second task, differently from the change request timing in a state where the vehicle is under congestion and where the driver does not perform the second task, and delay the change request timing when determining that the vehicle is under congestion, as compared with the change request timing when determining that the vehicle is under non-congestion, the driving assistance device further comprising:

a vehicle control unit configured to execute a longitudinal and/or lateral motion control of the vehicle, when the vehicle drives in the automatic operation.

15. The non-transitory computer readable medium according to claim 14, wherein the altering includes altering the change request timing according to an automatic operation level to which transition is made from the automatic operation by the driving change.

16. The non-transitory computer readable medium according to claim 15, wherein the altering includes advancing the change request timing more with reduction in the automatic operation level.

17. The non-transitory computer readable medium according to claim 14, wherein the change request timing is set according to a distance to or a time required for arrival at the end point.

18. The non-transitory computer readable medium according to claim 14, wherein the altering includes altering the change request timing according to a traveling speed of the vehicle.

19. The non-transitory computer readable medium according to claim 14, wherein the altering includes advancing the change request timing more when the driver performs the second task in driving in the automatic operation than when the driver does not perform the second task.

20. The non-transitory computer readable medium according to claim 14, wherein the change request includes a first change request and a second change request, which is made after the first change request.

* * * * *